United States Patent Office 3,162,668
Patented Dec. 22, 1964

3,162,668
HYDROCARBONTHIO-PHOSPHONOXYDIHY-
DROXYALKOXYALKYL ALKENOATES
David D. Reed, Glenham, and James M. Petersen, Fish-
kill, N.Y., and Herman D. Kluge, deceased, late of
Fishkill, N.Y., by Hazel E. Kluge, administratrix, Fish-
kill, N.Y., assignors to Texaco Inc., New York, N.Y.,
a corporation of Delaware
No Drawing. Filed Oct. 18, 1962, Ser. No. 232,647
6 Claims. (Cl. 260—461)

The subject invention relates to novel reaction products of a hydroxyepoxyalkane and hydrocarbonthiophosphon-oxyhydroxylalkyl alkenoate in the presence of acid as catalyst. More particularly, this invention is directed to hydrocarbonthiophosphonoxydihydroxyalkoxyalkyl alkenoates and their method of manufacture.

For reasons of brevity the hydrocarbonthiophosphon-oxydihydroxyalkoxyalkyl alkenoates will hereafter be known as alkoxyalkyl alkenoates.

The alkoxyalkyl alkenoates have demonstrated usefulness as thermal stability additives for fuels, e.g., jet fuels.

The alkoxyalkyl alkenoates are represented by the formula:

$$\begin{array}{c} X \quad R^1 \quad\quad R^2 \quad\quad O \\ \| \quad | \quad\quad | \quad\quad \| \\ R-P-O-CH-CH-CH-O-C-R^3 \\ | \quad\quad\quad\quad | \\ OH \quad\quad\quad O-CH-CH-CH-OH \\ \quad\quad\quad\quad\quad | \quad | \quad | \\ \quad\quad\quad\quad\quad R^4 \ OH \ R^5 \end{array}$$

where R is a monovalent hydrocarbon derived radical (hydrocarbyl), $R^1$, $R^2$, $R^4$ and $R^5$ are hydrogen or alkyl from 1 to 6 carbons, $R^3$ is alkenyl from 2 to 20 carbons and X is sulfur or a mixture of sulfur and oxygen.

The alkoxyalkyl alkenoates broadly are formed by reacting hydrocarbonthiophosphonoxyhydroxyalkyl alkenoates with a hydroxyepoxyalkane in the presence of an acid catalyst such as the Lewis acids, mineral acids and organic acids.

PREPARATION OF THE HYDROCARBONTHIO-PHOSPHONOXYHYDROXYALKYL ALKENOATE REACTANT

The hydrocarbonthiophosphonoxyhydroxyalkyl alkenoates and their preparation are described in co-assigned, copending application Serial No. 232,656, filed Oct. 18, 1962. Broadly, they are prepared by reacting a hydrocarbon with $P_2S_5$ to form a hydrocarbon–$P_2S_5$ reaction product, hydrolyzing the hydrocarbon–$P_2S_5$ reaction products to form a hydrocarbonthiophosphonic acid of the formula:

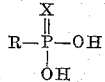

and then reacting the thus formed thiophosphonic acid with an epoxyalkyl alkenoate to form the hydrocarbon-thiophosphonoxyhydroxyalkyl alkenoates of the formula:

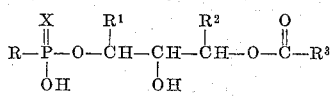

where R, $R^1$, $R^2$, $R^3$ and X are as heretofore defined.

As pointed out in the co-assigned, copending application Serial No. 232,656, the R radical in the foregoing formula is derived from a wide variety of hydrocarbons such as cycloaliphatic hydrocarbons, aromatic hydrocarbons and aliphatic hydrocarbons. Although a wide variety of hydrocarbons can be employed, olefins are generally used. Lubricating oil fractions and cracked hydrocarbon fractions constitute other preferred classes of materials for reaction with $P_2S_5$.

As further pointed out in Serial No. 232,656, X in the above formulas is designated as sulfur or a mixture of sulfur and oxygen because the steam hydrolysis step in the preparation of the hydrocarbonthiophosphonic acid usually results in the replacement with oxygen of a portion of the sulfur joined to the phosphorus.

The olefinic hydrocarbon reacted with $P_2S_5$ usually contains at least 12 carbon atoms although a lower molecular weight olefin can be employed. Olefin polymers such as polyisobutylene, polybutylene and polypropylene and copolymers of olefins such as propylene and isobutylene are preferred materials for reaction with $P_2S_5$. Generally, olefin polymers and copolymers having an average molecular weight between 250 and 50,000 are employed with polymers and copolymers having an average molecular weight in the range of 600 to 5,000 being particularly preferred. An example of a preferred olefin polymer is polybutene having an average molecular weight of 600 to 5,000.

Specific examples of the hydrocarbonthiophosphonoxy-hydroxyalkyl alkenoates contemplated herein are 3-polybutene(940 m.w.)thiophosphonoxy - 2 - hydroxypropyl 2-propenoate, 3-polypropylene(1500 m.w.)thiophosphon-oxy-2-hydroxy-3-butylpropyl 3-hexenoate and 3-polyiso-butylene(2500 m.w.)thiophosphonoxy - 1 - methyl - 2-hydroxypropyl 6-decenoate.

HYDROXYEPOXYALKANES

The hydroxyepoxyalkanes which react with the hydrocarbonthiophosphonoxyhydroxyalkyl alkenoate in the presence of acid catalysts to form the novel compounds of the invention are represented by the general formula:

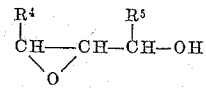

where $R^4$ and $R^5$ are hydrogen or alkyl from 1 to 6 carbons. Specific examples of the hydroxyepoxyalkane contemplated herein are 3-hydroxy-1,2-epoxypropane, 1-hydroxy-2,3-epoxypentane, 3-hydroxy-1,2-epoxybutane and 4-hydroxy-2,3-epoxyhexane.

ACID CATALYST

The acids which are contemplated as catalyst in the reaction of the hydroxyepoxyalkane with the hydrocarbyl-thiophosphonoxyhydroxyalkyl alkenoate are the Lewis acids, mineral acids and organic acids. Specific examples contemplated herein are $BF_3 \cdot C_2H_5OC_2H_5$, $BF_3$, $HF$, $AlCl_3$, $SnCl_4$, $TiCl_4$, $ZnCl_4$, $H_2SO_4$, $H_3PO_4$, $CCl_3CO_2H$ and $CF_3CO_2H$.

PREPARATION OF THE ALKOXYALKYL ALKENOATES OF THE INVENTION

The alkoxyalkyl alkenoates are prepared by reacting the hydroxyepoxyalkane with the hydrocarbonthiophos-phonoxyhydroxyalkyl alkenoate in the presence of acid catalyst at a temperature between about 50 and 150° C. in a reactant mole ratio of epoxyalkane to alkenoate reactant to catalyst of between about 0.5:1:0.01 and 2:1:0.1. The reaction is normally conducted at atmospheric pressure although superatmospheric and subatmospheric pressures may be employed. At the end of the reaction period the product may be purified by standard means such as removal of the unreacted reactants under reduced pressure (e.g., between about 0.01 and 30 mm. Hg) and elevated temperature (above 93° C.) utilizing an inert stripping gas e.g., nitrogen.

Specific examples of the alkoxyalkyl alkenoates contemplated herein are 3-polyisobutylene(940 m.w.)thiophosphonoxy-2-(2',3'-dihydroxypropoxy)-propyl 2-propenoate,
3-polyisobutylene(1500 m.w.)thiophosphonoxy-2-(2',3'-dihydroxypropoxy)-1-methylpropyl 3-hexenoate,
3-polypropylene(2500 m.w.)thiophosphonoxy-2-(2',3'-dihydroxypropoxy)-3-ethylpropyl 5-decenoate.

The following example further illustrates the invention but is not to be construed as a limitation thereof.

Example I

To a 1 liter, 3-neck flask fitted with a thermometer, stirrer and reflux condenser there was added 234 grams of mineral oil (100 SUS viscosity at 100° F.) containing 0.076 mole of 3-polybutene(940 m.w.)thiophosphonoxy-2-hydroxypropyl 2-propenoate of the formula:

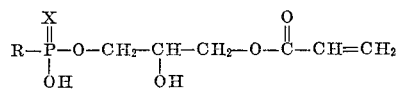

where R is a polybutene radical having an average molecular weight of 940 and X is a mixture of sulfur and oxygen giving the following analysis:

| Description | Calculated | Found |
|---|---|---|
| Hydroxyl No | 18.3 | 22 |
| Neut. No | 0 | 1.2 |
| Sulfur, Wt. Percent | [1] 1.04 | 0.56 |
| Phosphorus, Wt. Percent | 1.01 | 1.10 |

[1] X=100% sulfur.

The flask was then heated to 50° C. and stirring was begun. To the heated, stirred alkenoate reactant there was added 1.0 gram (0.007 mole) of boron trifluoride-etherate and 6.0 grams (0.077 mole) of 95% glycidol dropwise. The stirred reaction mixture was maintained at 50° C. for a 2 hour period whereupon the reaction mixture was stripped with nitrogen at 93° C. under a pressure of 0.2 mm. Hg and filtered. The filtered residual product was identified as 3-polybutene(940 m.w.)thiophosphonoxy-2-(2',3'-dihydroxypropoxy)-propyl 2-propenoate of the formula:

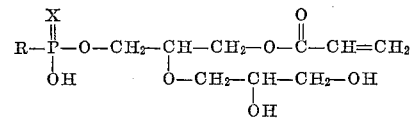

where R is a polybutene radical of an average molecular weight of 940 and X is a mixture of sulfur and oxygen. The product analyzed as follows:

| Description | Calculated | Found |
|---|---|---|
| Phosphorus, Wt. Percent | 0.98 | 0.98 |
| Sulfur, Wt. Percent | [1] 1.01 | 0.45 |
| Hydroxyl No | 36 | 33 |
| Neut. No | 0.00 | 3.70 |
| Mole ratio, glycidol/alkenoates reactants in product | 1 | 0.86 |

[1] X=100% sulfur.

We claim:
1. Hydrocarbonthiophosphonoxydihydroxyalkoxyalkyl alkenoate of the formula:

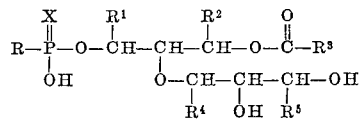

where R is a monovalent hydrocarbon derived from aliphatic polyolefin having a molecular weight between 250 and 50,000, $R^1$, $R^2$, $R^4$ and $R^5$ are members selected from the group consisting of hydrogen and alkyl of from 1 to 6 carbons, $R^3$ is alkenyl of from 2 to 20 carbons and X is a chalcogen selected from the group consisting of sulfur and a mixture consisting of a major portion of sulfur and a minor portion of oxygen.

2. An alkenoate in accordance with claim 1 wherein, $R^1$, $R^2$, $R^4$ and $R^5$ are hydrogen and X is a mixture consisting of a major portion of sulfur and a minor portion of oxygen.

3. An alkenoate in accordance with claim 1 wherein R is a polybutene having an average molecular weight of about 940, $R^1$, $R^2$, $R^4$ and $R^5$ are hydrogen, $R^3$ is vinyl and X is a mixture consisting of a major portion of sulfur and a minor portion of oxygen.

4. A method of preparing a hydrocarbonthiophosphonoxydihydroxyalkoxyalkyl alkenoate of the formula:

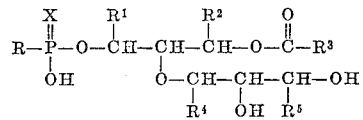

where R is a monovalent hydrocarbon derived from aliphatic polyolefin having a molecular weight between 250 and 50,000, $R^1$, $R^2$, $R^4$ and $R^5$ are members selected from the group consisting of hydrogen and alkyl, $R^3$ is alkenyl of from 2 to 20 carbons and X is a chalcogen selected from the group consisting of sulfur and a mixture consisting of a major portion of sulfur and a minor portion of oxygen comprising contacting a hydrocarbonthiophosphonoxyhydroxyalkyl alkenoate of the formula:

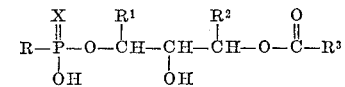

with a hydroxyepoxyalkane of the formula:

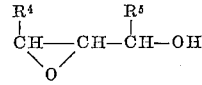

in the presence of catalyst selected from the group consisting of $BF_3 \cdot C_2H_5OC_2H_5$, $BF_3$, HF, $AlCl_3$, $SnCl_4$, $TiCl_4$, $ZnCl_4$, $H_2SO_4$, $H_3PO_4$, $CCl_3CO_2H$, and $CF_3CO_2H$ at a temperature between about 50 and 150° C. in a mole ratio of epoxyalkane to alkenoate reactant to catalyst of between about 0.5:1:0.01 and 2:1:0.1.

5. A method in accordance with claim 4 wherein, X is a mixture consisting of a major portion of sulfur and a minor portion of oxygen, $R^1$, $R^2$, $R^3$, and $R^4$ are hydrogen and $R^5$ is vinyl.

6. A method in accordance with claim 4 wherein R is a polybutene having an average molecular weight of about 940, X is a mixture consisting of a major portion of sulfur and a minor portion of oxygen, $R^1$, $R^2$, $R^3$, and $R^4$ are hydrogen, and $R^5$ is vinyl.

No references cited.